United States Patent [19]

Jones

[11] 3,907,730

[45] Sept. 23, 1975

[54] RESINOUS INITIATOR SUSPENSION FOR OLEFINIC POLYMERIZATION REACTIONS

[75] Inventor: Richard A. Jones, Avon Lake, Ohio

[73] Assignee: The B. F. Goodrich Company, Akron, Ohio

[22] Filed: Sept. 27, 1973

[21] Appl. No.: 401,366

[52] U.S. Cl. ...... 260/17.4 SG; 260/80 M; 260/80 C; 260/80 R; 260/80.3 R; 260/92.8 W; 260/884
[51] Int. Cl.² .................... C08F 114/02; C08L 5/00
[58] Field of Search .......... 260/80.3 R, 80 M, 80 C, 260/80 R, 928 W, 17.4 SG, 884

[56] References Cited
UNITED STATES PATENTS

| | | | |
|---|---|---|---|
| 2,772,258 | 11/1956 | Manganelli | 260/92.8 |
| 2,862,912 | 12/1958 | Ott | 260/884 |
| 3,312,678 | 4/1967 | Crano | 260/80 |
| 3,444,151 | 5/1969 | Verdol | 260/80 |

OTHER PUBLICATIONS

Chem. Absts. Vol. 73: 26207e, "Polymer Beads," Cohen.

Primary Examiner—Melvin Goldstein
Assistant Examiner—Edward Woodberry
Attorney, Agent, or Firm—Roy P. Wymbs

[57] ABSTRACT

A free-radical initiator suspension for use in olefinic polymerization reactions comprising a suspension of said initiator in a water-swellable lightly cross-linked polymer of one or more olefinically-unsaturated carboxylic acid monomers and the process of producing polymers employing said suspension.

19 Claims, No Drawings

RESINOUS INITIATOR SUSPENSION FOR OLEFINIC POLYMERIZATION REACTIONS

BACKGROUND OF THE INVENTION

In the commercial production of polymers and copolymers of monoolefinic monomers, such as, for example, polymers and copolymers of vinyl and vinylidene halides, either alone or with other vinylidene monomers having a terminal $CH_2=C<$ group, or with polyolefinic monomers, the polymers are produced in the form of discrete particles by polymerization in suspension in water. Such polymerization reactions are conducted in the presence of a suitable catalyst or initiator.

Many of the initiators for said polymerization reactions, such as, for example, diisopropyl peroxy dicarbonate, when used by themselves, are difficult and dangerous to handle. It is the present practice in the art to dissolve the initiator in an organic solvent, such as hexane or xylene, to facilitate handling thereof. However, when using such a solvent it has a tendency to remain in the polymer being produced which, in turn, makes drying of the polymer more difficult. Further, due to the flammability of such organic solvents, initiator handling is a problem, not only from the standpoint of directly handling a flammable substance, but also, such solvents add further fuel to a fire created by runaway initiator decomposition. This hazard has sometimes been avoided by employing a low volatility solvent, such as odorless mineral spirits or dimethyl phthalate. However, these materials are not satisfactory since they are extremely difficult, if not impossible, to remove from the polymer after drying. Accordingly, since the polymerization reaction takes place in a suspension system in water, a water-based suspension for the initiator would provide the heat sink needed for safety without the disadvantages of a flammable, difficultly removable solvent.

SUMMARY OF THE INVENTION

In accordance with the present invention, the above and other difficulties are avoided by forming a free-radical initiator or catalyst suspension in a water-swellable lightly cross-linked polymer of one or more olefinically-unsaturated carboxylic acid monomers. In the preparation of said suspension the lightly cross-linked polymer is added to the prescribed amount of water with mild agitation until a flowable plastic mass is obtained. Thereafter the catalyst or initiator is added to the flowable plastic mass and agitated or stirred until the suspension of the initiator is complete. The temperature employed when adding the polymer and then the initiator will vary according to the particular polymer and initiator being employed. The suspension of initiator or catalyst, made up in any suitable concentration, is charged to the olefinic polymerization reaction vessel in the same manner as any other water based solution is now charged in present-day commercial practice.

DETAILED DESCRIPTION

The synthetic resins or polymers employed as catalyst or initiator suspending agents or media in the present invention are the lightly cross-linked interpolymers of one or more carboxylic acid monomers with a polyunsaturated compound having a plurality of terminally unsaturated polymerizable groups. The carboxylic acid monomers utilizable in preparing the polymeric suspending agents of the present invention are those which contain at least one active carbon-to-carbon double bond in the $\alpha,\beta$ position with respect to a carboxyl group thusly (1) 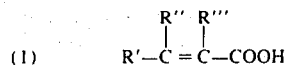

wherein R' is hydrogen or a —COOH group, and each of R" and R"' is a hydrogen or a monovalent substituent group which is linked to one of the doubly bonded carbon atoms. Carboxylic acids within this definition include acids such as acrylic acid wherein the double bond is terminal thusly (2) 

or the dicarboxylic acids such as maleic acid and other anhydrides of the general structure (3) 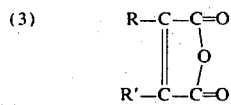

wherein R and R' are monovalent substituent groups and especially those selected from the group consisting of hydrogen, halogen and cyanogen (—C ≡ N) groups and alkyl, aryl, alkaryl, aralkyl and cycloaliphatic radicals.

Included within the class of carboxylic acids, shown by generic formula (1) above, are widely divergent materials as the acrylic acids, such as acrylic acid itself, methacrylic acid, ethacrylic acid, $\alpha$- and $\beta$-chloro, bromo-, and cyanoacrylic acids, crotonic acid, $\beta$-acryloxy propionic acid, $\alpha$-$\beta$ isopropylidene propionic acid, cinnamic acid, maleic acid, fumaric acid, itaconic acid, and many others.

Polymerizable carboxylic anhydrides include any of the anhydrides of the above acids, including mixed anhydrides, and those shown by generic formula (3) above, including maleic anhydride and others. In many cases it is preferred to copolymerize an anhydride monomer with a comonomer, such as methyl vinyl ether, styrene, and the like.

In the present invention it is preferred to employ polymeric suspension agents derived from polymers produced by the polymerization of the $\alpha$-$\beta$, monoolefinically unsaturated carboxylic acids. The more preferred carboxylic acids are those derived from the acrylic acids and $\alpha$-substituted acrylic acids having the general formula (4) 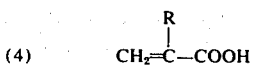

wherein R is a monovalent substituent selected from the group consisting of hydrogen, halogen, hydroxyl, carboxyl, amide, ester, lactone, lactam, and cyanogen groups.

The most preferred polymeric suspending agents are those prepared from the lightly cross-linked interpolymers of acrylic acid these suspending agents are the most efficient and have the most desirable viscosity characteristics, viscosity stability and suspending ability.

The cross-linking agents which may be employed with any of the above-named carboxylic monomers, or mixtures thereof, may be any compound, not necessarily monomeric in nature, containing a plurality, that is two or more, of terminal polymerizable $CH_2{=}C{<}$ groups per molecule. Examples of this class of material include polyunsaturated-hydrocarbons, -polyethers, -polyesters, -nitriles, -acids, -acid anhydrides, -ketones, -alcohols and polyunsaturated compounds of this class incorporating one or more of these and other functional groups. Specifically, there may be utilized divinyl benzene, divinyl naphthalene, low molecular weight and soluble polymerized dienes, such as polybutadiene and other soluble homopolymers of openchain aliphatic conjugated dienes, which soluble polymers do not contain any appreciable number of conjugated double bonds, and other polyunsaturated hydrocarbons; polyunsaturated esters, ester-amides and other ester derivatives, such as ethylene-glycol diacrylate, ethylene-glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl, and -crotyl polyethers containing from two to seven or more of these or other alkenyl ether groupings per molecule and made from polyhydric alcohols such as the carbohydrate sugars, and the socalled "sugar alcohols" including erythritol, pentaerythritol, arabitol, iditol, mannitol, sorbital, inositol, raffinose, glucose, sucrose, and many others, and other polyhydroxy carbohydrate derivatives; the corresponding polyalkenyl silanes, such as the vinyl and allyl silanes; and others. Of this large class the polyalkenyl polyethers of the carbohydrate sugars, sugar alcohols and other polyhydroxy carbohydrate type derivatives containing from two to seven alkenyl ether groupings per molecule are particularly preferred. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the polyhydroxy carbohydrate derivatives. Cross-linking agents of this class produce essentially completely gelled, cross-linked carboxylic polymers which retain their rheological efficiency during neutralization and during service, have the ability to swell most highly and produce smooth, creamy and nongrainy mucilaginous compositions of the greatest suspending efficiency.

Among the catalysts or initiators which may be suitably suspended in the water-swellable lightly cross-linked carboxylic polymers are the alkanoyl, aroyl, alkaroyl and aralkanoyl diperoxides and monohydroperoxides, azo compounds, peroxyesters, percarbonates, and other free radical type catalysts. Illustrative of such catalysts are dibenzoyl peroxide, dilauryl peroxide, diacetyl peroxide, cumene hydroperoxide, methyl ethyl ketone peroxide, diisopropylbenzene hydroperoxide, 2,4-dichlorobenzoyl peroxide, naphthoyl peroxide, acetyl cyclohexane sulfonyl peroxide, t-butyl perbenzoate, tert-butyl peroxyneodecanoate, di-t-butyl perphthalate, diisopropyl peroxydicarbonate, di(sec-butyl) peroxydicarbonate, di-normal propyl peroxydicarbonate, and the like, azo-bis-isobutyronitrile, alpha, alpha-azodiisobutyrate, and the like. The choice of any particular free radical catalyst is dictated in part by the particular monomer or monomers to be polymerized, by the color requirements of the polymer, and to some extent by the temperature of polymerization to be employed.

The free-radical initiator suspension of the present invention is particularly adapted for use in those polymerization reactions which are conducted in an aqueous medium, such as dispersion or suspension polymerization and emulsion polymerization reactions. The invention is particularly adapted for use in the suspension polymerization of vinyl chloride, either alone or with other vinylidene monomers having at least one terminal $CH_2{=}CH{<}$ grouping. While the present invention is specifically illustrated hereinafter in connection with the suspension polymerization of vinyl chloride, it is to be understood that the free-radical initiator suspension of the present invention may likewise be employed in the polymerization in aqueous dispersion or suspension of any polymerizable ethylenically unsaturated monomer or monomers, either alone or in admixture with each other. Examples of such monomers are other vinyl halides and vinylidene halides, such as vinyl bromide, vinyl fluoride, vinylidene chloride, vinylidene fluoride, etc.; vinylidene monomers having at least one terminal $CH_2{=}CH{<}$ grouping, such as esters of acrylic acid, for example, methyl acrylate, ethyl acrylate, butyl acrylate, octyl acrylate, cyanoethyl acrylate, and the like; esters of methacrylic acid, such as methyl methacrylate, butyl methacrylate, and the like; styrene and styrene derivatives including $\alpha$-methyl styrene, vinyl toluene, chlorostyrene, and the like; acrylonitrile, ethyl vinyl benzene, vinyl acetate, vinyl naphthalene, etc.; diolefins including butadiene, isoprene, chloroprene, and the like, and other vinylidene monomers of the types known to those skilled in the art.

As previously pointed out, the present invention is particularly applicable to the suspension polymerization of vinyl chloride, either alone or in admixture with one or more other vinylidene monomers copolymerizable therewith in amounts as great as about 80% or more by weight, based on the weight of the monomer mixture.

The water-swellable lightly cross-linked polymers of one or more olefinically unsaturated carboxylic acid monomers, used in the present invention, are made by the solution polymerization technique. The particular method employed in the preparation of the cross-linked polymer has considerable effect on the water-sensitivity and colloidal gel-like properties of the polymer. Polymerization of a substantially anhydrous monomer mixture in a hydrocarbon solvent for the monomers but a nonsolvent for the polymer or in a mixture of such solvents containing a solvent-soluble peroxygen catalyst, or other so-called free-radical type of catalyst, is required, the produce obtained being a very fine and often fluffy precipitate, which, after solvent removal seldom requires further grinding or other treatment. Suitable solvents include benzene, toluene, xylene, hexane, heptane, methyl chloride, ethyl chloride, carbon tetrachloride and other aliphatic and aromatic hydrocarbons, and mixtures of these and many other hydrocarbon solvents.

Polymerization in an organic solvent may be carried out in a closed vessel under pressure or under reflux at atmospheric pressure. Polymerization in a solvent medium, such as benzene, hexane, or heptane, under reflux at 50° to 85°C. under atmospheric pressure using a solvent-soluble peroxygen catalyst will generally bring about a polymer yield of 75 to 100% in less than 10 hours, usually in less than 5 hours. The polymerization rate is ordinarily faster in the absence of atmospheric oxygen so that the reaction is preferably carried out in an evacuated vessel or under an inert atmosphere, such as that of a volatile monomer or nitrogen, and the like.

The water-insoluble but highly water-sensitive cross-linked carboxylic acid polymers used as the suspension medium in the present invention are in the acid-form when prepared. They can be employed in this form by adding to sufficient water, with agitation, to form a flowable plastic paste. Thereafter, the desired initiator, or initiators, is added with stirring until a permanent suspension of the initiator or catalyst is obtained. The temperature will vary depending upon the catalyst being suspended. Normally, temperatures in the range of 0°C. to about 30°C. will suffice.

While the cross-linked carboxylic acid polymers may be employed in the acid-form, they do attain their greatest water-sensitivity after partial neutralization. Partial neutralization with monovalent alkalis, such as sodium, potassium, or ammonium hydroxides or carbonates, and the like, causes the polymers to swell very greatly in water and to exhibit a more desirable pH.

The mucilage viscosity of the cross-linked carboxylic acid polymers increases rapidly with neutralization, reaching a peak viscosity and a peak yield value at a pH near that of complete neutralization. The mucilage viscosity of the carboxylic acid polymers increases rapidly in the range of 25% to 85% neutralization. Neutralization with sodium hydroxide to the extent of 10% raises the pH of the carboxylic acid polymer plastic mass or mucilage from about 2.5 to about 3.5, 25% neutralization raises it to about 4.0, 55% to a pH of about 6.0, 75% to a pH of about 7.0 and 85% to a pH of about 9.0 or slightly higher.

From the standpoint of suspending an oil, it would be preferred to use the mucilage near 100% neutralization. However, many initiators are quite sensitive to high pH and begin to degrade more rapidly as the pH of the suspending agent goes up. Since mucilaginous compositions having a pH in the range of 4 to 9 possess the best properties for use in the present invention, it is preferred to neutralize to the extent of 25% to 85%. However, I have achieved good suspensions with minimal degradation of the initiator when neutralizing to the extent of 25% to 50%.

Neutralization of the cross-linked carboxylic acid polymer is preferably carried out using water-soluble monovalent alkalis, such as sodium, potassium, lithium and ammonium hydroxides, carbonates, bicarbonates, oxides and others, or with amine bases having not more than one primary or secondary amino group. Polyvalent bases, such as calcium hydroxide and in fact, any polyvalent metal cation, have a powerful deswelling action on the suspension or mucilaginous composition and therefore, are not desirable. On the other hand, however, when it is desirable to alter the viscosity characteristics of the composition, a polyvalent metal hydroxide can be used in combination with a monovalent hydroxide. For example, it has been noted that the carboxylic acid polymer may be neutralized to the extent of as much as 5% to 20% by employing about 10% of a polyvalent metal hydroxide together with 25% to 75% of a monovalent hydroxide, such as sodium hydroxide. In the event that deionized water is not employed in making the free-radical initiator suspension, described herein, then sequestering agents may be added to the system to minimize the effects of trace amounts of polyvalent metal ions inevitably present in water.

In the process or preparing polymers and copolymers, in accordance with the present invention, an aqueous reaction medium is employed in which the free-radical initiator or catalyst is highly effective. It is advantageous, although not essential, to add to the aqueous reaction medium a small amount of a dispersant in order to obtain a more complete and uniform dispersal of the vinylidene monomer(s) and catalyst. Any of the well known dispersants operative in aqueous medium may be employed. These include, among others, methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetate, etc.

The materials employed in the polymerization process are charged into a polymerization chamber, which may be any of the polymerization receptacles commonly used for such reactions. The polymerization chamber is first purged with nitrogen to remove all traces of air. Thereafter, the materials to be used in the reaction are charged to the polymerization chamber in the following manner: first, the reaction medium or water is added and then the dispersant, if one is employed, is added to the water with agitation or stirring. If desired, and for convenience, the water and dispersant may be admixed before charging. Next, the monomer or monomers, to be polymerized are added to the reaction medium with continued agitation. The polymerization receptacle is normally jacketed so that cooling or heating media can be passed therethrough in order to maintain the temperature of the polymerizer ingredients at the appropriate and pre-determined level, both prior to and during the polymerization reaction. Usually the temperature of the polymerization reaction will be in the range of 0°C. to about 80°C. To a great extent, the particular temperature employed will depend upon the particular vinylidene monomer or monomers being polymerized.

The polymerization receptacle is equipped with a cap having an opening extending therethrough in which appropriate means are inserted for injecting materials into the reaction medium. The last to be added to the polymerization reaction medium is the catalyst suspension and it is injected into the chamber through the cap. It should be pointed out that the catalyst or initiator suspension need not be added last but may be added at any stage. The catalyst suspension may be added all at once or in increments during the polymerization reaction. In many reactions it may be desirable to add the suspension of catalyst in a continuous manner over a pre-determined period of time. The mode of addition of the suspension of catalyst of the present invention will depend a great deal upon the particular catalyst employed and the rate of polymerization of the particular vinylidene monomer or monomoers being polymerized as well as the rate of conversion, and percent of conversion, desired in any particular polymerization reaction.

The present invention will be described more fully in the specific examples which follow hereinafter, it being understood that this is by way of illustration and not by limitation. In the examples, all parts and percentages are by weight unless otherwise indicated.

EXAMPLE I

In this Example, vinyl chloride was polymerized in an aqueous suspension system using di-secondary butyl peroxydicarbonate as the initiator or catalyst in an initiator suspension system. The initiator suspension contained the following ingredients:

| | |
|---|---|
| 1% Crosslinked polymer* | 400 gms. |
| Di-secondary butyl peroxydicarbonate(SBP) | 40 gms. |
| 18% NaOH solution | 8 ml. |

*1% of a polymer of acrylic acid crosslinked with 0.5 part per 100 parts of monomer of allyl pentaerythritol in water.

In preparing the initiator suspension the SBP was slowly added to the 1% cross-linked polymer with agitation and the agitation continued for 4–5 minutes thereafter. Then the NaOH solution was slowly injected into the suspension by means of a syringe until 77% neutralization was achieved. Thereafter agitation was continued for 5 minutes.

The initiator suspension thus prepared was utilized in polymerizing vinyl chloride in accordance with the following recipe:

| | |
|---|---|
| Vinyl chloride | 865 gms. |
| Water (demineralized) | 1730 gms. |
| PVA (88% hydrolyzed polyvinyl acetate)(2%) | 43 gms. |
| Initiator suspension | 2.38 gms. |

The above ingredients were mixed together in a polymerization reactor and with agitation and under an atmosphere of nitrogen, were reacted for a period of 13 hours at a temperature of 50°C. At the end of this time the polyvinyl chloride polymer was recovered giving a yield of 50–60%.

EXAMPLE II

Here, vinyl chloride was polymerized in an aqueous suspension system, as in Example I, employing tert-butyl peroxyneodecanoate (TBND) as the initiator or catalyst in an initiator suspension system having the composition:

| | |
|---|---|
| 1% Cross-linked polymer (Same as Ex. 1) | 400 gms. |
| Tert-butyl peroxyneodecanoate (75% active) | 53.3 gms. |
| 18% NaOH solution | 8 ml. |

The above materials were mixed, as in Exammple I, and the suspension was neutralized to 77%. The polymerization recipe was as follows:

| | |
|---|---|
| Vinyl chloride | 868 gms. |
| Water (demineralized) | 1730 gms. |
| PVA (2%) | 43 gms. |
| TBND suspension (8.7%) | 9.47 gms. |

The polymerization reaction was carried out at a temperature of 50°C. for a period of 6 hours giving a yield of polyvinyl chloride of 77%.

EXAMPLE III

In this Example the following initiator suspension recipe was used:

| | |
|---|---|
| 1% Cross-linked polymer (Same as Ex. 1) | 400 gms. |
| Di-normal propyl peroxydicarbonate (NPP) | 40 gms. |
| 18% NaOH solution | 2.7 ml. |

These ingredients were mixed as in Example I and the suspension neutralized to 25%. The polymerization recipe was as follows:

| | |
|---|---|
| Vinyl chloride | 990 gms. |
| Water (demineralized) | 1980 gms. |
| PVA (2%) | 49 gms. |
| NPP suspension (10%) | 2.08 gms. |

The polymerization reaction was conducted at 50°C. for 10.6 hours to give a yield of polyvinyl chloride of 74%.

EXAMPLE IV

In this Example the following initiator suspension recipe was used:

| | |
|---|---|
| 1% Cross-linked polymer (Same as Ex. 1) | 400 gms. |
| Acetyl cyclohexane sulfonyl peroxide (ACSP) (29% active) | 138 gms. |
| 18% NaOH solution | 2.7 ml. |

These materials were mixed as in Example I and the suspension neutralized to 25%. The polymerization recipe was as follows:

| | |
|---|---|
| Vinyl chloride | 890 gms. |
| Water (demineralized) | 1730 gms. |
| PVA (2%) | 43 gms. |
| ACSP suspension (10%) | 4.65 gms. |

The polymerization was carried out at 50°C. for a period of 7.75 hours to give a yield of polyvinyl chloride of 85%.

EXAMPLE V

In this Example the following initiator suspension recipe was employed:

| | |
|---|---|
| 1% Cross-linked polymer (Same as Ex. 1) | 300 gms. |
| Di-secondary butyl peroxydicarbonate(SBP) | 30 gms. |
| 5% Sodium metasilicate solution | 50 gms. |

These ingredients were mixed as in Example I with the 50 gms. of 5% sodium metasilicate being that amount sufficient to achieve maximum suspending power. The polymerization recipe was as follows:

| | |
|---|---|
| Vinyl chloride | 830 gms. |
| Water (demineralized) | 1730 gms. |
| PVA (2%) | 43 gms. |
| SBP suspension (8%) | 2.89 gms. |

These ingredients were polymerized at 50°C. for a period of 8.1 hours to give a yield of polyvinyl chloride of 80%.

As can be determined from the above description and examples, one primary advantage of the present invention is the elimination of the use of organic solvents in polymerization reactions as carriers for initiators or catalysts and the ease of drying the resultant polymers. Removing of organic solvents from the polymer is eliminated and thus also the danger of fire due to the flammability of said solvents. Further, with the elimination of the necessity of removing organic solvents from the polymer, the cost of the process of producing such polymers is reduced. Further, the catalyst suspensions of the present invention are capable of being stored as such for appropriate periods of time commensurate with efficient plant operation at reduced cost of manufacture. Many other advantages of the present invention will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. In a process for polymerizing one or more vinylidene monomers having a terminal CH$_2$=CH< grouping wherein said monomer or monomers are dispersed in an aqueous polymerization reaction medium, the improvement which comprises adding a freeradical polymerization initiator to the aqueous polymerization reaction medium in the form of a suspension of said initiator in a water-insoluble, water-swellable lightly cross-linked polymer of one or more olefinically unsaturated carboxylic acid monomers containing sufficient water to form a flowable plastic mass, said cross-linked polymer being produced by solution polymerizing in an organic solvent at least one carboxylic acid monomer selected from the group consisting of (1) those monomers having the formula

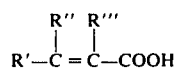

wherein R' is hydrogen or a COOH group, and each of R'' and R''' is a hydrogen or a monovalent substituent group which is linked to one of the doubly bonded carbon atoms, and (2) those monomers having the formula

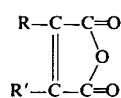

wherein R and R' are monovalent substituent groups selected from hydrogen, halogen, cyanogen (—C ≡ N) groups, alkyl, aryl, alkaryl, aralkyl and cycloaliphatic radicals, in the presence of a cross-linking agent which contains a plurality of terminal polymerizable CH$_2$=C< groups per molecule, said agent being selected from the group consisting of polyunsaturated hydrocarbons, -polyethers, -polyesters, -nitriles, -acids, -acid anhydrides, -ketones, -alcohols, and polyunsaturated compounds incorporating one or more of these functional groups.

2. A process as defined in claim 1 wherein the carboxylic acid monomer is one having the formula

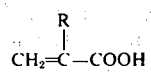

wherein R is a monovalent substituent selected from the group consisting of hydrogen, halogen, hydroxyl, carboxyl, amide, ester, lactone, lactam, and cyanogen.

3. A process as defined in claim 2 wherein the carboxylic acid monomer is acrylic acid.

4. A process as defined in claim 1 wherein the freeradical polymerization initiator is di(sec-butyl) peroxydicarbonate.

5. A process as defined in claim 1 wherein the initiator is acetyl cyclohexane sulfonyl peroxide.

6. A process as defined in claim 1 wherein the carboxylic acid monomer is acrylic acid and the cross-linking agent is allyl sucrose.

7. A process as defined in claim 1 wherein the carboxylic acid monomer is acrylic acid and the cross-linking agent is allyl pentaerythritol.

8. A process as defined in claim 6 wherein the initiator is di(isopropyl)peroxydicarbonate.

9. A new composition comprising a water-insoluble, water-swellable lightly cross-linked polymer of one or more olefinically unsaturated carboxylic acid monomers containing sufficient water to form a flowable plastic mass and having suspended therein a freeradical polymerization initiator, said cross-linked polymer being formed from at least one carboxylic acid monomer selected from the group consisting of (1) those monomers having the formula

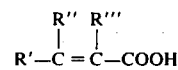

wherein R' is hydrogen or a COOH group, and each of R'' and R''' is a hydrogen or a monovalent substituent group which is linked to one of the doubly bonded carbon atoms, and (2) those monomers having the formula

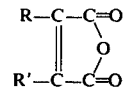

wherein R and R' are monovalent substituent groups selected from hydrogen, halogen, cyanogen (-C ≡ N) groups, alkyl, aryl, alkaryl, aralkyl and cycloaliphatic radicals, and a cross-linking agent which contains a plurality of terminal polymerizable CH$_2$=C< groups per molecule, said agent being selected from the group consisting of polyunsaturated hydrocarbons, -polyethers, -polyesters, -nitriles, -acids, -acid anhydrides, -ketones, -alcohols, and polyunsaturated compounds incorporating one or more of these functional groups.

10. A composition as defined in claim 9 wherein the carboxylic acid monomer is one having the formula

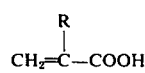

wherein R is a monovalent substituent selected from the group consisting of hydrogen, halogen, hydroxyl, carboxyl, amide, ester, lactone, lactam, and cyanogen.

11. A composition as defined n claim 10 wherein the carboxylic acid monomer is acrylic acid.

12. A composition as defined in claim 9 wherein the free-radical polymerization initiator is di(sec-butyl)peroxydicarbonate.

13. A composition as defined in claim 9 wherein the initiator is acetyl cyclohexane sulfonyl peroxide.

14. A composition as defined in claim 9 wherein the carboxylic acid monomer is acrylic acid and the cross-linking agent is allyl sucrose.

15. A composition as defined in claim 14 wherein the initiator is di(isopropyl)peroxydicarbonate.

16. A process as defined in claim 1 wherein the cross-linking agent is a polyunsaturated polyether.

17. A process as defined in claim 16 wherein the polyunsaturated polyether is allyl sucrose.

18. A composition as defined in claim 9 wherein the cross-linking agent is a polyunsaturated polyether.

19. A composition as defined in claim 18 wherein the polyunsaturated polyether is allyl sucrose.

* * * * *